(12) United States Patent
Bitzer et al.

(10) Patent No.: US 7,603,893 B2
(45) Date of Patent: Oct. 20, 2009

(54) METHOD FOR DETERMINING THE ROTATIONAL SPEED OF A PART, ASCERTAINING THE SLIPPING OF A CONTINUOUSLY VARIABLE TRANSMISSION (CVT), AND FOR CONTROLLING A CVT, AND A CONICAL DISC FLEXIBLE DRIVE TRANSMISSION

(75) Inventors: Franz Bitzer, Friedrichshafen (DE); Martin Vornehm, Bühl (DE); Christian Lauinger, Baden-Baden (DE); Michael Reuschel, Ottersweier (DE); Christian Späth, Baden-Baden (DE); Christoph Angele, München (DE); Thomas Pfund, Leiberstung (DE); André Linnenbrügger, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 686 days.

(21) Appl. No.: 10/510,142

(22) PCT Filed: Apr. 10, 2003

(86) PCT No.: PCT/DE03/01196

§ 371 (c)(1),
(2), (4) Date: Jun. 10, 2005

(87) PCT Pub. No.: WO03/087846

PCT Pub. Date: Oct. 23, 2003

(65) Prior Publication Data

US 2005/0277500 A1    Dec. 15, 2005

(30) Foreign Application Priority Data

| Apr. 10, 2002 | (DE) | ................................ 102 15 715 |
| Apr. 15, 2002 | (DE) | ................................ 102 16 544 |
| May 16, 2002 | (DE) | ................................ 102 21 700 |

(51) Int. Cl.
*G01M 13/02* (2006.01)
(52) U.S. Cl. .................................................. 73/115.02
(58) Field of Classification Search ............. 73/114.25, 73/115.01, 115.02, 115.03, 115.06, 115.07, 73/115.08
See application file for complete search history.

(56) References Cited

U.S. PATENT DOCUMENTS

| 4,995,470 | A | * | 2/1991 | Yamaguchi et al. ......... 180/197 |
| 5,515,272 | A | * | 5/1996 | Sakai et al. .................... 701/29 |

(Continued)

FOREIGN PATENT DOCUMENTS

EP    1 158 214 A2    11/2001

*Primary Examiner*—Eric S McCall
(74) *Attorney, Agent, or Firm*—Alfred J. Mangels

(57) ABSTRACT

The input rotational speed of a belt-driven conical-pulley transmission is determined by measuring a wheel rotational speed and the transmission ratio and by calculating the input rotational speed therefrom. In order to ascertain the slipping of a CVT transmission, the rate of change in the transmission ratio is drawn upon, or an acoustic parameter of the transmission is used. In the fluid control system, a valve is used whose opening cross-section is controlled according to the one differential pressure. In order to oil the conical discs, injection holes of an injection tube are used that passes through a slot provided in a slide rail resting against a strand of a flexible torque transmitting member of a conical disc flexible drive.

9 Claims, 4 Drawing Sheets

U.S. PATENT DOCUMENTS 5,936,158 A * 8/1999 Ashizawa et al. ............ 73/488
7,356,399 B2 * 4/2008 Eguchi et al. ................ 701/61
2002/0095992 A1 * 7/2002 Gierling et al. ............... 73/659

* cited by examiner

METHOD FOR DETERMINING THE ROTATIONAL SPEED OF A PART, ASCERTAINING THE SLIPPING OF A CONTINUOUSLY VARIABLE TRANSMISSION (CVT), AND FOR CONTROLLING A CVT, AND A CONICAL DISC FLEXIBLE DRIVE TRANSMISSION

BACKGROUND OF THE INVENTION

1. Field of the Invention

The invention relates to a method for determining the rotational speed of a part among a plurality of components included in a torsional vibration prone system and coupled with respect to their rotatability. The invention furthermore relates to a method for determining the slippage of a continuously variable transmission (CVT) and a method for controlling a CVT. Additionally the invention relates to a belt-driven conical-pulley transmission.

2. Description of the Related Art

Transmissions with continuously variable gear ratios, so-called continuously variable transmissions (CVT) (for example belt-driven conical-pulley transmissions, friction gear transmissions, etc), are increasingly being used in motor vehicles for reasons of comfort and reduced fuel consumption, which are actuated such by a control unit that depending on the activation of a gas pedal or a request that can be input by the driver on one hand, a satisfactory dynamic vehicle behavior results, and on the other hand driving occurs with low fuel consumption. FIG. 1 shows an example of a motor vehicle power train.

A motor vehicle has an engine 2, which in the illustrated example is connected to a cardan shaft 8 by means of a clutch 4 and a transmission 6. By means of a differential 10, the cardan shaft drives the drive shafts 12, which are non-rotatably connected to rear wheels 14. The front wheels 16 are also shown in the illustrated example.

An electronic control unit 18 with a microprocessor and corresponding storage devices has inputs 20 that are connected to sensors. A sensor 22 for detecting the rotational speed of a transmission input shaft, a throttle valve sensor 24, an engine speed sensor 26, a wheel rotational speed sensor 28, for example, and possibly further sensors are provided. Outputs of the control unit 18 are connected to a clutch-activating device 32 and a transmission-activating device 34, as well as possibly with additional actuators of the power train, such as a throttle valve regulating unit, etc.

The transmission 6 is a CVT in the example represented, the activating device 34 of which is selected hydraulically. By means of a selector lever 36 a reverse travel step as well as several shifting programs can be activated.

Various problems arise in the practical operation of such power trains equipped with continuously variable transmissions, the solution of which is important for a comfortable and also reliable use of the CVT over extended operating periods. It is important, for example, for the control or regulation unit of the CVT to know the exact rotational speed of its input shaft. The ability to use an input rotational speed signal detected directly on the input shaft for control or regulating purposes, of for example the transmission ratio of the CVT, is limited since the input rotational speed can have oscillations that are present in the power train. Moreover it is required for various reasons to detect slippage of the CVT operating with frictional engagement to avert permanent damage. The gear ratio change is also subject to problems, especially in the case of belt-driven conical-pulley transmissions whose conical pulley pairs each have only one pressure chamber for pressing and adjustment.

The invention is based upon the objective of providing remedies for the aforementioned problems occurring in practice.

SUMMARY OF THE INVENTION

A solution to the task of determining the rotational speed of a part among a plurality of components contained in a torsional vibration prone system coupled with respect to their rotatability is achieved in that the rotational speed of a component arranged in or on a vibration node is measured, and the rotational speed of the part is calculated from the measured rotational speed and the transmission ratio between the component and the part.

When two components are arranged on two different sides of a vibration node, it is advantageous to use the average value of the rotational speeds of the components for calculating the rotational speed of the part.

Advantageously, the previously described method is used to determine the input rotational speed of a CVT contained in a power train of a motor vehicle, wherein the rotational speed of at least one wheel driven by the CVT is measured, and the input rotational speed is calculated from the transmission ratio of the CVT as well as possibly additional gear ratios between the output of the CVT and the wheel.

It is advantageous to measure the at least one wheel rotational speed as well as the input rotational speed and the output rotational speed of the CVT, and to use the transmission input rotational speed, which has been calculated based on the measured variables as well as possibly additional gear ratios between the output of the CVT and the wheel, for controlling and/or regulating power train components.

Advantageously, a measured transmission input rotational speed and the calculated one are used at a predetermined weighting level for controlling and/or regulating power train components.

It is useful if the weighting depends on the transmission ratio of the CVT.

One method for determining the slippage of a CVT is characterized in that the rate of change of the transmission ratio is determined, and in that the determined rate of change is compared to a predetermined rate of change that has been calculated from operating parameters of the CVT, and is ascertained as slippage when the determined rate of change deviates from the calculated rate of change beyond a predetermined level.

A maximum value of the calculated rate of change is advantageously proportional to 1/transmission ratio$^n$, wherein n has a value between 1.5 and 2, and is ascertained as slippage when the determined rate of change exceeds the maximum value by a predetermined extent.

Another method for determining the slippage of a CVT is characterized in that at least one value of an acoustic parameter of the CVT that changes during slippage is stored. The acoustic parameter is measured and ascertained as slippage or imminent slippage when the measured parameter approaches the stored value in a predetermined fashion.

In an advantageous method for determining the slippage of a CVT, the timewise change of the output rotational speed of the transmission is determined and considered as at least imminent slippage when the timewise change of the output rotational speed exceeds a predetermined limit value.

Another advantageous method for determining the slippage of a CVT is characterized in that the timewise change of the force acting upon at least one of the wheel brakes of a vehicle equipped with the CVT is determined and is considered as at least imminent slippage when the timewise change of the force exceeds a predetermined value.

Advantageously, when slippage or imminent slippage is determined, a correcting variable of the CVT is adjusted such that the slippage is counteracted.

One method for controlling a CVT with a belt apparatus embracing two conical pulley pairs, wherein each conical pulley pair includes a single pressure chamber that is subject to fluid pressure for adjusting the contact pressure between the conical pulley pair and the belt apparatus, as well as for changing the transmission ratio of the CVT, is characterized in that the opening cross-section of a control valve contained in the fluid connecting lines of the pressure chambers is pre-controlled as a function of a difference between the fluid pressures present in the pressure chambers that is required for a predetermined rate of change of the transmission ratio.

A belt-driven conical-pulley transmission with two conical pulley pairs with two conical pulleys each (the distance between which is adjustable), a belt apparatus embracing the conical pulleys, a slide rail guiding one strand of the belt apparatus having on its end facing the other strand at least one rib extending parallel to the belt apparatus and increasing in thickness from the changing slide rails to the center. A tube is arranged in the area of the center of the rib and extending approximately perpendicular to a plane in which the belt apparatus runs, for the purpose of spraying fluid at least into the spaces between the conical pulleys of the conical pulley pairs, and is advantageously designed such that the rib on its surface facing the other strand includes a groove in the region of its center such that fluid sprayed out of the holes formed in the pipe passing through the groove reaches directly into the spaces between the conical pulleys.

The tube preferably contains at least one additional hole, from which the sprayed fluid directly reaches the other side.

The invention, which can be used in CVTs of different designs in the most diverse applications, is explained precisely below through examples.

Another advantageous embodiment of the method according to the invention relates to an evaluation of slippage events, which are detected and recorded or stored, for example in a control unit of the vehicle. Here, advantageously, the output of a slippage event is calculated, and depending on whether the output exceeds a predetermined limit an error entry occurs in the control unit. Tests have shown that not every slippage event leads to damage of the surface of the variable speed transmission discs or the rocker members of the chain. It has also been shown that damage at greater output does not necessarily lead to permanent damage, so that one or more limit values may be introduced, specifically with respect to the output of a slippage event as well as the frequency. Then, a corresponding assessment can take place in the vehicle directly or in a repair shop.

The time-dependent output P of a slippage event can be determined, for example according to $$P = M \times \Delta\omega$$

with the torque M present on the variable speed transmission, which can be determined, for example, from a pressure sensor for the contact pressure, and the differential angular speed $\Delta\omega$, which can be determined from the excess variable speed transmission ratio during a slippage event, between the slipping chain and the variable speed transmission.

Advantageously the maximum value of the output P determined this way is used for comparisons. Nonetheless, it may also be advantageous to use other variables, such as the output integral over time or statistically approximated values. The use of more exact methods than the evaluation of the maximum value can then occur when this is enabled by the processor power of the control unit.

It has been shown that a classification of the output levels of the slippage events in output ranges is advantageous. For example, output levels of up to 5.10 kW can be classified as minor damage and values above as severe damage. The number of slippage events can be recorded hereby in an error memory in accordance with this classification. An error counter can moreover be integrated such that the slippage events are weighted and added. A weighting of the errors can likewise occur by means of prior damage since a slippage event following damage can have a more serious effect than in the case of an undamaged transmission. The error counter can be dimensioned as a function of materials used in the transmissions and their characteristics such as variable speed transmission surfaces, of the output of the internal combustion engine, the gear oil that is used, and the like. When exceeding a limit in the error counter, the driver can receive a warning, for example in a single step or multiple steps from a simple display, regarding a request to drive to a repair shop, all the way to a forced shut-off of the vehicle to protect it from further-reaching damage.

DESCRIPTION OF THE PREFERRED EMBODIMENTS

Figure 1:
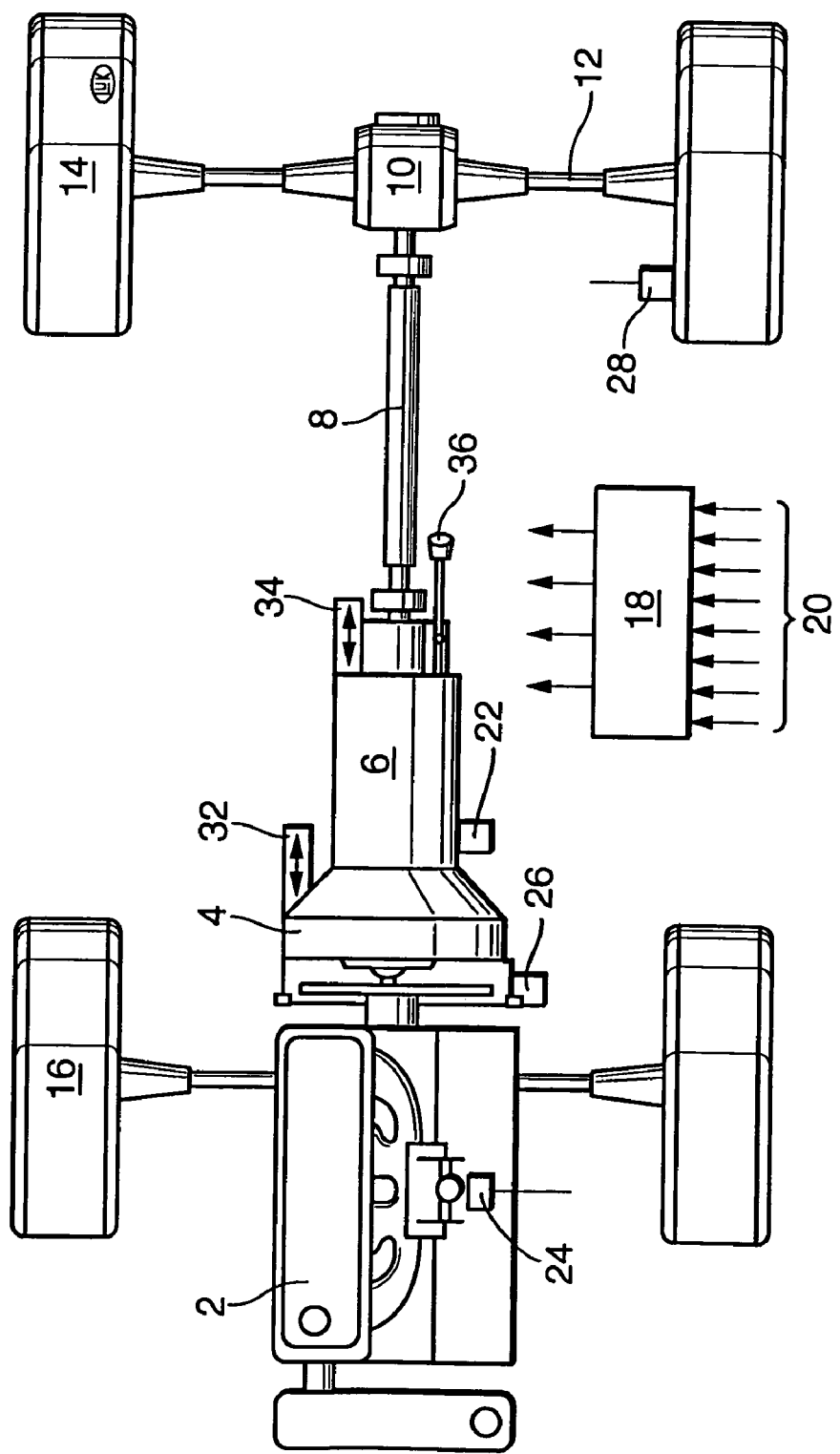
FIG. 1 a power train of a vehicle that has already been explained.

Methods are known in which the control of the transmission 6, which is implemented in the control unit 18 or in decentralized additional control units, is based on the control of the input rotational speed of the transmission 6. When the transmission input rotational speed is measured directly, the measurement signal contains jerking and harsh frequencies. These frequencies have an interfering effect on the transmission ratio control and obstruct a good adjustment of the command variables. In the extreme case feedback may occur, which influences the transmission ratio control. For this reason a signal that does not contain such vibrations, or only to a limited extent, is desirable. Strong filtration with high time constants, which leads to smoothing, is not permissible due to the clearly reduced dynamics.

A solution to this problem is in the measurement of a little vibration-prone rotational speed in a region that from a vibration-technical point forms a vibration node or is arranged close to such a node.

A power train with an engine, a transmission, and a vehicle wheel coupled with a street by means of a tire, wherein the components are connected to each other by means of shafts, represents a system capable of torsional vibration. Here, engine and transmission can vibrate against the vehicle mass, wherein the natural frequency is typically 7.1 Hertz and the rotational speed of the second order is 212 $\text{min}^{-1}$. In a different mode, the transmission vibrates between engine and vehicle mass, wherein the natural frequency is typically 19.8 Hertz and the rotational speed of the second order is 593 min$^{-1}$. In another mode, the wheel vibrates between transmission and vehicle mass. The natural frequency is then typically 47.9 Hertz and the rotational speed of the second order is 1,436 min$^{-1}$. In another mode the transmission input vibrates between motor and the remainder of the drive drain with a natural frequency of typically 71.4 Hertz, which corresponds to a rotational speed of the second order of 2,143 min$^{-1}$. In the case of a belt-driven conical-pulley transmission, the transmission ratio of the variable speed transmission (conical pulley pairs with belt apparatus) can be calculated from the measurement of the rotational speeds of the first conical pulley pair and the second conical pulley pair. Since the variable speed transmission from a vibration-technical point is very rigid, no jerking or harsh frequencies can be found in the calculated transmission ratio. The wheel rotational speed can advantageously be taken from an ABS control unit, to which rotational speed signals that are taken directly from the wheel are fed. It is important that the wheel rotational speed is recorded directly on the wheel and not on the transmission output, for example the beginning of a drive shaft 12 (FIG. 1), since the rotational speed there contains jerking frequencies as well.

From the measured wheel rotational speed and the measured transmission ratio, as well as further gear ratios of the power train, in the illustrated example the gear ratio of the differential 10, the transmission input rotational speed $n_b$ can be calculated from the following equation:

$$n_b = i_{CVT} \cdot i_p \cdot n_R,$$

wherein $i_{CVT}$ is the transmission ratio of the CVT, $i_p$ the gear ratio of the differential, and $n_R$ the wheel rotational speed.

Of course, further gear ratios may be added when additional gear steps are located between the input disc pair of the CVT and its input shaft or in a different location.

Should a vibration node be located between two measuring areas, a vibration-free rotational speed signal can be generated by forming the average of the rotational speeds measured on both sides of the vibration node.

With the illustrated method the resistance of the gear ratio control towards power train vibrations is improved. The risk of influence during high control amplifications is clearly diminished. Through correspondingly higher permissible control amplification the control behavior can be improved.

The described method can be employed in all types of continuously variable transmissions, such as friction gears, belt-driven conical-pulley transmissions, for example in a geared neutral design, or in 12 structure, etc. In particular when changing their transmission ratio, such CVTs can be the source for generating jerking vibrations, can increase or dampen jerking vibrations, or be impaired in their own function by jerking vibrations.

The transmission ratio of a belt-driven conical-pulley transmission is adjusted by modifying the contact forces between the conical pulley pairs and the belt apparatus. This modification takes place by means of selection of hydraulic valves, which adjust corresponding pressure levels. Due to the complex adjusting behavior of belt transmissions (dependent upon rotational speed, torque, transmission ratio, and the contact forces themselves), control circuits are used in which, for example, an actual transmission ratio is calculated using the measured rotational speed, and a target transmission ratio is calculated using the current driving situation (speed, gas pedal actuation, etc.). Moreover control units are known in which the actual rotational speed of the transmission input is measured and a target rotational speed is determined based on the current driving situation. It is likewise known that these control units not only counteract the target/actual deviation very quickly, but in doing so also limit the actual change of the rotational speed through a target change of the rotational speed that corresponds to the current driving situation. This way, dynamic torque released during the adjustment process is limited while increasing driving comfort.

When the measured actual input rotational speed is not used directly as the actual input rotational speed of the transmission that is fed to the control unit, but instead, as described above, in a first step the transmission ratio of the transmission is calculated from the measured rotational speeds on the transmission input and on the transmission output, and then the rotational speed on the transmission input is calculated from this transmission ratio and the measured rotational speed of a driven wheel, this offers the advantage that no special adjustment of band-pass filters to the jerking frequency, which is dependent upon the transmission ratio, is required. By insulating and dampening the jerking vibrations, the comfort and control quality of the CVT control unit can be improved.

It is advantageous to further develop the previously described method such that an input rotational speed $n_E$ of the transmission, which is determined based on the following formula, is used as the input variable for a control unit used to adjust the transmission ratio of the CVT:

$$n_E = \alpha \times n_b + (1-\alpha) \times n_g, \text{ wherein}$$

$n_b$ is the input rotational speed calculated based on formula (1), $n_g$ the directly measured transmission input rotational speed $n_g$, and $\alpha$ is a weighting factor. For $\alpha=0$ only the measured transmission input rotational speed, which is subject to jerking, is used for control purposes. For $\alpha=1$ the jerking-decoupled calculated input rotational speed $n_b$ is used. For $\alpha>1$ the control unit creates a counter-coupling situation; for values of $\alpha<0$, a regeneration is created by the control unit; for intermediate values "partial decoupling" arises. Depending on the control unit structure, through a suitable selection of $\alpha$, hence the CVT adjustment can be modulated such that jerking vibrations are dampened.

According to the invention the control unit can be implemented with a fixed value of $\alpha$. It is advantageous to make the value of $\alpha$ dependent upon the current transmission ratio since jerking vibrations can occur in isolated transmission ratio ranges. The required value of $\alpha$ can be deduced from the occurrence of jerking vibrations. The occurrence of jerking vibrations can be detected using filters.

Another problem recurring during the operation of continuously variable transmissions is that the pressure force between the frictionally engaged transmitting parts is not sufficient for transmitting the present torque so that slippage occurs, which can damage the transmission irreversibly. Slippage cannot be detected solely by evaluation of the speed differentials, as is common, for example, for clutches, since in a CVT due to the variable transmission ratio no fixed rotational speed ratio exists.

According to the invention slippage detection occurs with the aid of transmission ratio gradients. CVTs have a finite adjusting speed, i.e., for a change in the transmission ratio certain duration is required. When a transmission ratio change occurs at a greater rate of change than is possible in slippage-free operation, then slippage can be inferred.

Due to the physical properties of a continuously variable transmission based on the belt wrap principle, a maximum possible adjusting speed is not a constant, but rather depends on various parameters such as rotational speed, torque, and current transmission ratio. The strongest influence is provided by the current transmission ratio. Theoretically, it can be estimated that the maximum possible transmission ratio rate of change is proportional to 1/transmission ratio$^n$. A value of n=2 is the maximum permissible value; suitable are values between 1.5 and 2, advantageous is 1.7. The permissible transmission ratio gradient is roughly the same in both adjusting directions.

In practice the maximum possible adjusting speed can be determined with a specified transmission ratio, for example at maximum underdrive. Due to the above-mentioned equation then, the maximum adjusting speed for the other transmission ratios can be calculated, wherein for the calculation of the current maximum adjusting speed, rotational speeds are used that are filtered prior to processing and rescanned with a different scanning frequency. Likewise, filters and rescanning algorithms can be used for the transmission ratio.

In the case of desired quick transmission ratio changes, adjusting gradients can be greater than a limit criterion. To prevent this from leading to undesired error entry in an error memory of the control unit, slippage monitoring is shut off in such situations. Slippage events with low adjusting gradients are not recorded with the described method. Slippage events with initially low gradients, however, typically reach adjusting speeds above the limit criterion when slippage is decreased.

As a modification of the described method, the change in the variable speed transmission ratio can be calculated in a mathematical model as a function of different operating parameters, such as the engine speed, the transmission input speed, the transmission ratio, the input torque, the temperature, and of axial forces. During operation these variables are known so that based on the mathematical model the adjustment dynamics di/dt can be calculated, wherein i is the transmission or variable speed transmission ratio. When an actually measured adjusting gradient deviates from the calculated rate of change beyond a predetermined level, then this points to slippage.

Advantageously, a lower limit can be defined for the adjustment dynamics, beneath which no evaluation occurs. This way it is prevented that in the case of only small expected adjusting gradients, erroneously slippage is detected due to possible numerical inaccuracies.

For reasons of calculation time, the mathematical model can be simplified in that only the main influencing parameters are taken into consideration. In the case of a belt-driven conical-pulley transmission, the adjustment dynamics primarily depend on the axial force and the variable speed transmission ratio. Axial force here should not be interpreted as the absolute force, but instead a force differential to the stationary operating point, which is described by the static zeta progression.

The following applies to this force differential:

$$F_{diff} = F_{s1} - \xi \times F_{s2};$$

wherein $\xi$ designates the force ratio between the force on the first disc pair and the force on the second disc pair in the stationary operating state on a transmission ratio=$F_{s1\_stat}/F_{s2\_stat}$, wherein $F_{s1}$ or $F_{s2}$ represent the current force on the first or second disc pair, respectively.

The transmission ratio dependency can be described by means of an adjusting coefficient $k_i$ (which is dependent upon the transmission ratio i and the adjusting direction) so that the adjustment dynamics can be described with the following formula:

$$di/dt = k_i \times (F_{s1} - \xi \times F_{s2}).$$

The value $k_i$ can be stored in a characteristic line for the upshift or back shift.

In a continuously variable transmission, what applied force will lead to what adjustment can be calculated or measured. When taking the adjustment dynamics known from (3) into consideration, it can be determined whether the adjustment occurs from the applied force differential or was caused by other events (slippage).

In order to make slippage detection even safer and reduce the influence of variations, a factor between 1.5 and 3, for example, can be inserted into formula (3) in order to define an upper limit, which must be exceeded to detect slippage. In this way, it is ensured that small fluctuations in the adjustment dynamics are not interpreted as slippage. It also ensures that slippage detection does not result when an error occurs or a high noise level exists when determining the actual gradient.

It has surprisingly turned out that another possibility for detecting slippage in a CVT, especially in a belt-driven conical-pulley transmission, is in its acoustic analysis. When a sensor having a sensitivity level in the frequency range of solid-borne sound and/or ultrasound is installed on the input or output shaft directly on the conical pulley, or in a region having a solid-borne sound transmitting connection to a conical pulley, a characteristic sound line or a characteristic sound field can be detected, which indicates the sound behavior of the variable speed transmission as a function of slippage at various transmitted torque levels and contact pressure levels as well as possibly different rotational speeds. When the acoustic behavior of the variable speed transmission is known in this fashion and stored, then a currently measured acoustic parameter, or its progression for example, can allow a conclusion of imminent slippage, and this slippage can be counteracted in a timely fashion by increasing the contact pressure so that damage can be prevented. Of course, when arranging the sound sensor directly on a conical pulley, familiar non-contact signal transmission techniques may be employed.

In the aforementioned method used to detect slippage, only very little time is available for taking counter-measures against the slippage (for example increasing the contact pressure of the conical pulleys in CVT's with electronic control), or it is too late to completely prevent slippage since a certain period of time is required for signal processing, for example signal filtration. It is therefore desirable to have information about imminent slippage events available already prior to the actual slippage event, so that, e.g., the contact pressure can be raised in time.

An advantageous method for the early detection of slippage involves determining the timewise change of the output rotational speed $n_{Ab}$ and evaluating it as an imminent slippage event when the timewise change value exceeds a predetermined limit. In numerous vehicle measurements, it has been found that a slippage event in CVTs is always preceded by a large value of the timewise derivation of the output rotational speed of the transmission, for example due to heavy braking or ABS braking. Due to a blocking or alternately slipping and not slipping wheel, high dynamic torque levels are introduced into the power train, leading to a slippage of the continuously variable transmission when no special countermeasures are taken. The advantage to using $dn_{Ab}/dt$ for detecting imminent slippage consists not only of the reaction time that is gained, but also of the fact that the limit is constant or at most depends on the type of its calculation. The calculation is advantageously performed such that the timewise change of the output rotational speed is averaged across two or three values that are determined within a very short time. This averaging is useful in order to reduce variations in the determined rate of change values. In the averaging, however, not too many values should be included, because then the time advantage of the described method is lost.

It is possible with this method to take timely countermeasures to avoid slippage events for CVT transmissions, the contact pressure of which, for example, is controlled completely electronically, or which apart from a torque sensor possess additional possibilities (electric motor, additional valves, etc.) for an electronically controlled adjustment. The method can also be employed for pre-control purposes in a slippage-controlled/slippage-regulated adjustment.

Moreover it is advantageous to combine the method for determining the timewise change of the output rotational speed with the method described further above for determining the rate of change or the timewise change of the transmission ratio of the CVT. The method, just as the other methods, can be employed in unbranched and power-branched transmissions.

Figure 2:
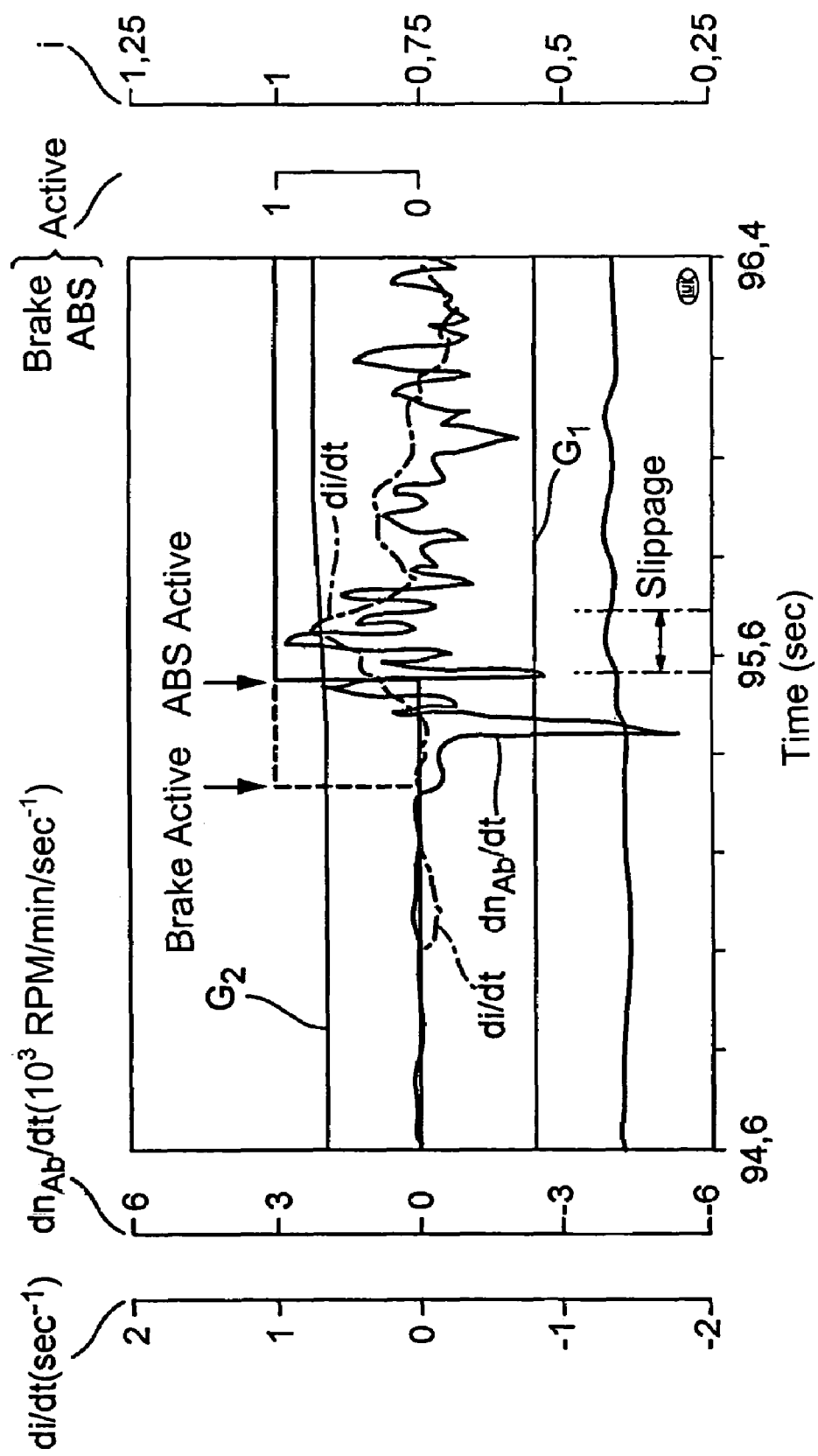
FIG. 2 curves to explain the early detection of slippage.

Based on FIG. 2, the benefits of the described method will be explained in the following: In FIG. 2 the time in the normal progression of a measurement is entered on the x-axis, i.e., the measurement results are shown for the time from 94.6 seconds to 96.4 seconds. The di/dt curve indicates the timewise change of the transmission ratio i of the CVT. The $dn_{Ab}/dt$ curve indicates the timewise change of the output rotational speed. The arrow marked with "brake active" indicates the beginning of a braking operation. The arrow marked with "ABS active" indicates the beginning of the actions of an ABS system. The horizontal double arrow marked with "slippage" indicates the time period during which the CVT slips when no counter-measures are taken. The line $G_1$ represents the limit, which must be exceeded by $dn_{Ab}/dt$ (absolute value) to be able to interpret the high delay in the output rotational speed as imminent slippage of the transmission. The line $G_2$ represents the limit, which must be exceeded by the timewise change of the transmission ratio i of the CVT to be able to interpret it as slippage of the continuously variable transmission.

As is apparent, $dn_{Ab}/dt$ exceeds the permissible limit $G_1$ already significantly prior to the occurrence of the slippage (and then again at the beginning of the slippage), while di/dt does not exceed the permissible limit $G_2$ until the transmission is already slipping. The time period of about 150 ms between the detection of the imminent slippage and the actual slippage is sufficient to avoid slippage through suitable counter-measures. Typical values for $G_1$ are for example between 1500 and 2000 RPM.

In a further method for the early detection of slippage in a continuously variable transmission, the rate of change of the braking pressure that is fed to a wheel is measured or, in the case of otherwise actuation of the brake, the braking force with which the brake is actuated. When the timewise change of one of these variables exceeds certain limits, similar measures for preventing slippage of the CVT can be taken as in the above-described method for determining the timewise change of the output rotational speed.

Figure 3:
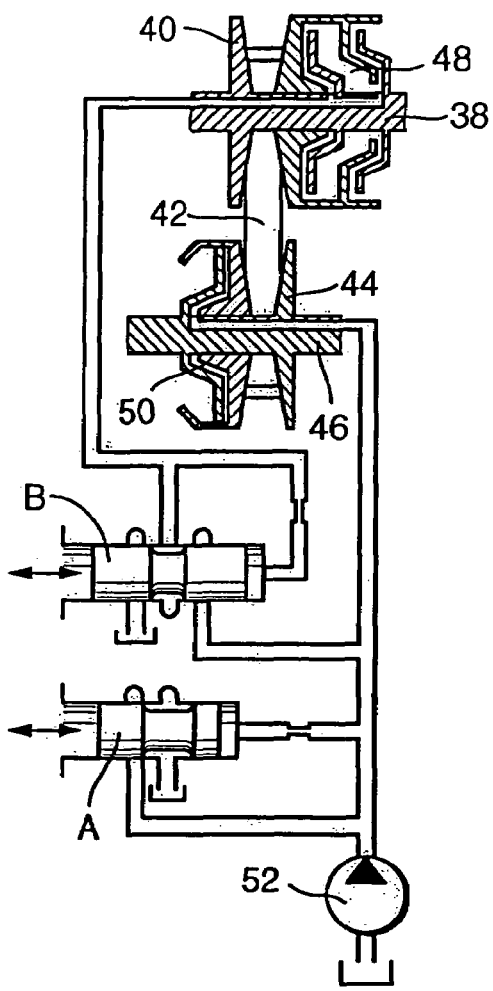
FIG. 3 a schematic diagram of a hydraulic selection of a belt-driven conical-pulley transmission, FIG. 4 a graph showing pre-control characteristic lines for opening a valve, FIG. 5 a side view of a belt-driven conical-pulley transmission, and FIG. 6 a perspective view of a portion of a slide rail.

FIG. 3 shows a diagram of a hydraulic control of a CVT.

An input shaft 38 drives a first conical pulley pair 40, which is connected in a frictionally engaged manner via a belt apparatus 42 to a second conical pulley pair 44, which drives an output shaft 46. For pressing purposes between the conical pulleys of each conical pulley pair and the belt apparatus 42, and for adjusting the distance between the conical pulleys of each cone pulley pair or the transmission ratio of the belt-driven conical-pulley transmission, each conical pulley pair is assigned a pressure chamber 48 or 50, which is connected to a pump 52 by means of pressure lines and valves.

In the embodiment according to FIG. 3 a valve A controls the pressure that is applied to the conical pulley pair 42. A valve B controls the pressure that is applied to the input-side conical pulley pair 40. Hence, the contact pressure can be controlled via the valve A, while adjustment of the transmission ratio occurs together with valve B. The valves are controlled by the control unit 18 (FIG. 1).

The pressure that is built up in the pressure chambers 48 and 50 must be large enough at all times that a slippage-free condition is guaranteed between the belt apparatus 52 and the conical pulley pairs. At the same time pressure differentials must be adjusted between the disc pairs in order to adjust the respectively desired transmission ratio.

During the adjustment in the transmission ratio, also the volume of the respective pressure chamber changes due to the axial movement of a conical pulley. One problem resulting from this is that in the event of a change in pressure that is required due to a change in the transmitted torque, hardly any hydraulic fluid or oil is moved without a transmission ratio adjustment, while during an adjustment in the transmission ratio high volume currents flow, depending on the desired adjusting speed. Changes in pressure are this way associated with extraordinarily varying volume currents, or an extraordinarily varying segment behavior of the variable speed transmission.

The torque-dependent contract pressure is determined by a contact pressure rule in harmony with the respective variator. The adjusting pressure required for maintaining or adjusting a desired transmission ratio is supplied by a transmission ratio regulator. The adjusting pressures active in each of the pressure chambers allow a conclusion of the adjusting force based on the geometric conditions of the pressure chambers. The difference in the adjusting forces is a good measure for the developing adjusting speed and hence the required volume current.

If a pre-control unit is used parallel to the actual pressure regulator which opens the valve or valves more or less far as a function of the adjusting force differential, or the adjusting pressure differential, the variable segment behavior can be compensated.

Pre-control takes place in the control software. It pre-controls the pressure circuit in the sense of disturbance variable compensation.

Such pre-control is advantageous for all types of disc designs, which operate with only one pressure chamber per disc set or disc pair. It is also possible to implement an individual selection for each disc pair with one valve, respectively, which would be a modification to the embodiment according to FIG. 2.

Figure 4:
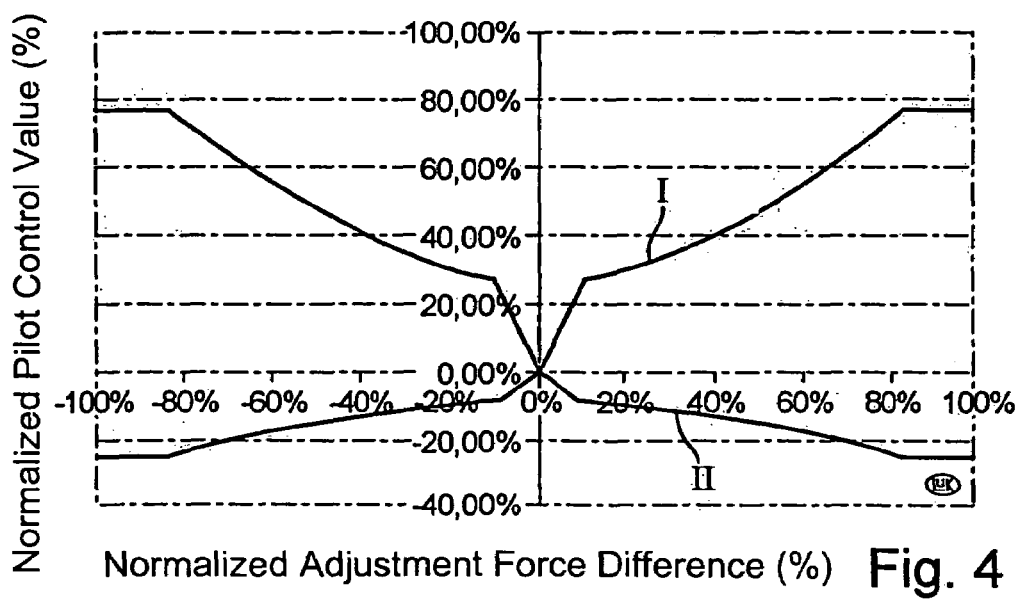

FIG. 4 illustrates a connection between the pre-control value and the adjusting force differential in scaled form. A negative adjusting force differential corresponds to a transmission ratio adjustment in the direction of underdrive, a positive one in the direction towards overdrive. The adjusting force differential is supplied by the transmission ratio regulator. A pre-control value can be determined from the characteristic lines, and in accordance with this value the pre-control valve can be opened. The characteristic line I is assigned to the disc pair 40, the characteristic line II to the disc pair 42.

Figure 5:
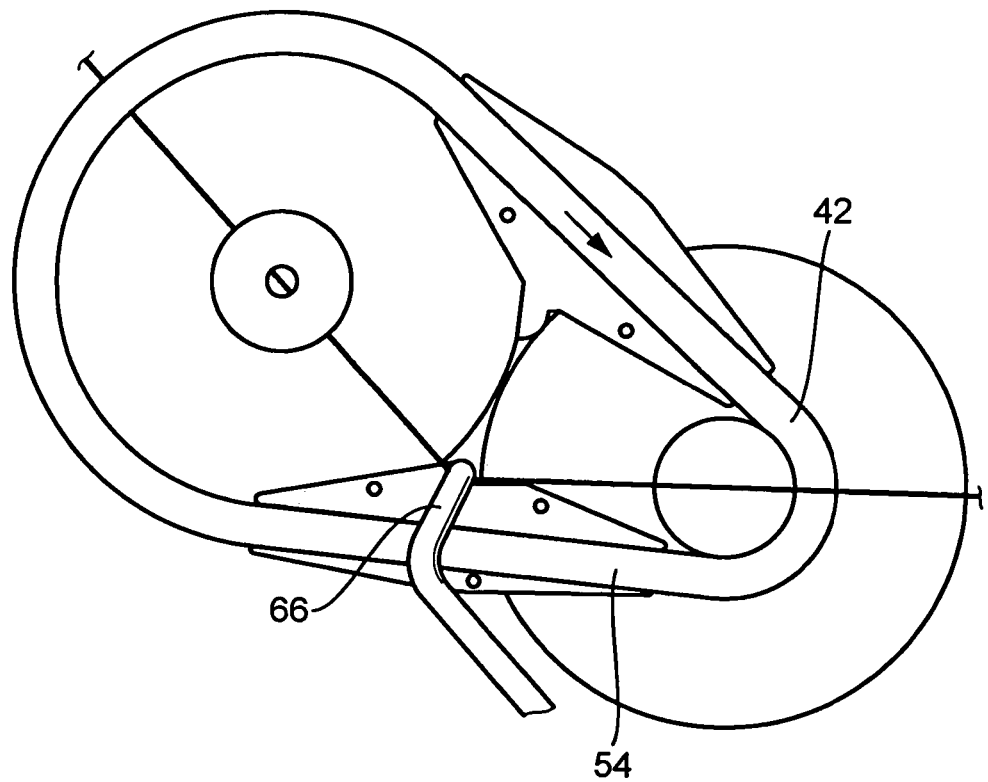
Figure 6:
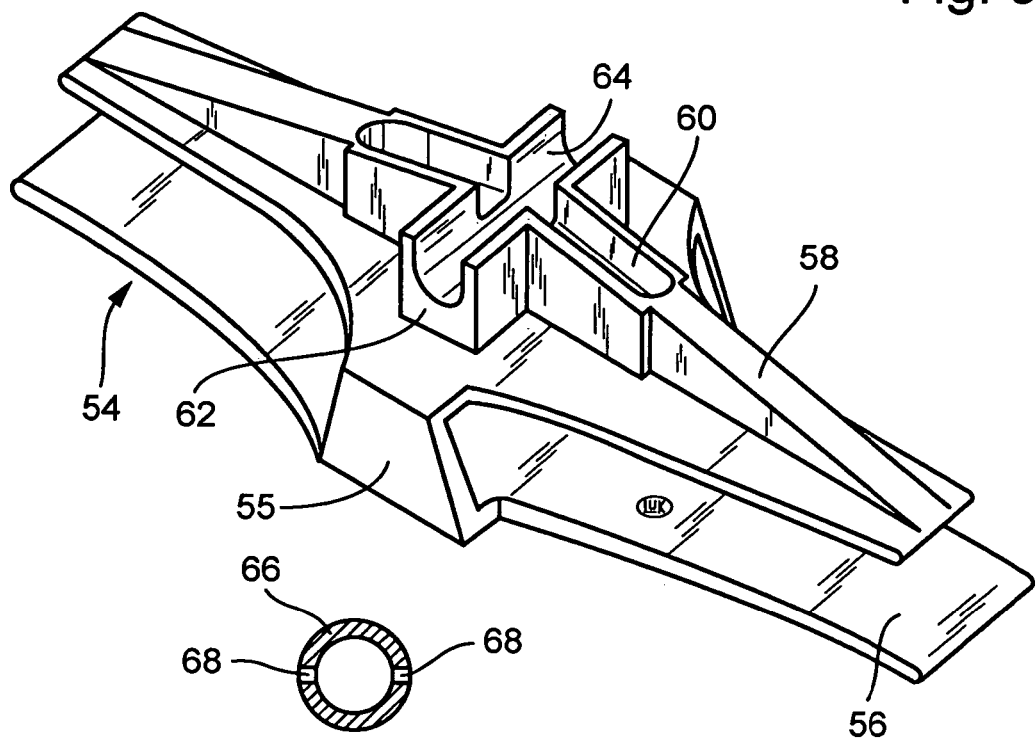

For a flawless long-term function of a belt-driven conical-pulley transmission, good lubrication of the conical surfaces of the cone pulley pairs is important. FIGS. 5 and 6 show a solution to this problem:

According to FIG. 5, which shows a side view of a belt-driven conical-pulley transmission with one conical pulley removed, the belt apparatus 42 wrapping around the two conical pulley pairs extends along a guide or slide rail 64, which is seated in the familiar fashion, such that the undriven half runs resting safely on the slide rail 54, regardless of the respective transmission ratio.

According to FIG. 6, which shows a perspective view, the slide rail 54 comprises two slide plates connected via a bar 55, these plates forming between them a guide channel 56 in which the belt apparatus, for example a metal chain, runs. To reinforce it mechanically, the slide rail 54 is equipped on its side facing the other half of the belt apparatus with a rib 58, the thickness of which increases from the ends of the slide rail towards the center. At least in the region of the center, the rib 58 includes parallel to its longitudinal extension a groove 60, the depth of which has its maximum in the region of the center of the rib 58. In the region of the groove 60 the rib, as is shown in FIG. 6, has a Y-shaped cross-section. A channel 64, which accommodates a spraying pipe 66 (not shown in the perspective view) having spraying holes 68 (see small cross-sectional view) in the region of the groove 60, extends transversely to the groove 60 through the rib 58 and through an additional reinforcement projection 62. The groove 60, or its base, is shaped such that oil that is sprayed from the spraying holes and serves the cooling and lubrication of the belt-driven conical-pulley transmission, reaches the spaces between the conical pulleys and onto the shafts of the conical pulley pairs, regardless of the respective transmission ratio. Advantageously additional holes are provided, from which oil is sprayed onto the opposite half.

Of course, the illustrated design can be modified in various ways as long as it is ensured that oil reaches the intermediate spaces between the conical pulley pairs continuously. For example, the channel 64 can be closed so that it forms directly the spraying tube, and spraying holes are incorporated in it. In this case a hydraulic line is connected to the channel.

The patent claims submitted with the application are formulation suggestions without prejudice for achieving farther-reaching patent protection. The applicant reserves the right to claim additional feature combinations that have so far only been disclosed in the description and/or drawings.

References used in the dependent claims point to the further development of the object of the main claim by features of the respective dependent claim. They should not be interpreted as a waiver for obtaining independent object-related protection for the feature combinations of the referenced dependent claims.

Since the objects of the dependent claims with respect to the state of the art can form their own and independent inventions on the priority date, the applicant reserves the right to make them the object of independent claims or declarations of division, having a form that is independent from the objects of the preceding dependent claims.

The embodiments should not be interpreted as a limitation of the invention. Rather, within the framework of the present disclosure numerous changes and modifications are possible, especially such variations, elements, and combinations, and/or materials, that are obvious to those skilled in the art with respect to the solution of the task at hand, for example by combining or modifying individual features and/or elements or procedural steps described in connection with the general description and embodiments, as well as contained in the drawings, and by features that can be combined into a novel object or novel procedural steps or procedural step sequences, also to the extent that they relate to manufacturing, testing, and operating methods.

What is claimed is:

1. A method for determining the rotational speed of a component among a plurality of components contained in a torsional vibration prone system that includes a transmission, and wherein the components are rotatably coupled, said method comprising the steps of:
    positioning a rotational speed sensor at or on a vibration node position within the vibration prone system for measuring a rotational speed,
    measuring the rotational speed of a first rotating component within the system with the rotational speed sensor, wherein the first component is arranged in or on the vibration node, and
    calculating the rotational speed of a second component whose rotational speed is to be determined, wherein the calculation utilizes the measured rotational speed of the first component and a transmission ratio between the first component and the second component.

2. A method according to claim 1, including the steps of: measuring the rotational speeds of first and third components of the system that are arranged on different sides of the vibration node, averaging the measured rotational speeds of the first and third components, and utilizing the average value of the measured rotational speeds of the first and third components in the calculation of the rotational speed of the second component.

3. A method according to claim 1 for determining the input rotational speed of a continuously variable transmission (CVT) contained in a power train of a vehicle, said method including the steps of: measuring the rotational speed of at least one vehicle wheel driven by the CVT, and calculating the input rotational speed of the transmission from the transmission ratio of the CVT and from gear ratios of elements positioned between the output of the CVT and the vehicle wheel.

4. A method according to claim 3, wherein at least one vehicle wheel rotational speed, the input rotational speed, and the output rotational speed of the CVT are measured, and the transmission input rotational speed that has been calculated from the measured variables as well as gear ratios of elements positioned between the output of the CVT and the vehicle wheel is used for controlling components of the power train.

5. A method according to claim 3, wherein a measured and the calculated transmission input rotational speed are used at a predetermined weighting of the magnitudes of the respective measured and calculated transmission input rotational speeds to control components of the power train.

6. A method according to claim 5, wherein the predetermined weighting is a function of the transmission ratio of the CVT.

7. A method according to claim 1, wherein the transmission is a belt-driven conical-pulley transmission and including the step of detecting whether a slippage event has occurred between transmission components, and when a slippage event has been detected an evaluation occurs with respect to damage to the belt-driven conical-pulley transmission.

8. A method according to claim 7, including the step of initiating as a function of the evaluation measures for determining further operation of the transmission.

9. A method according to claim 7, wherein the evaluation of the damage is performed in the form of a measurement of the output of the transmission following a slippage event.

* * * * *